(12) United States Patent
Watanabe et al.

(10) Patent No.: US 6,378,840 B1
(45) Date of Patent: Apr. 30, 2002

(54) ELECTROMAGNETIC VALVE

(75) Inventors: Masamichi Watanabe, Kariya; Taku Itoh, Chita-gun, both of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/661,090

(22) Filed: Sep. 13, 2000

(30) Foreign Application Priority Data

Sep. 13, 1999 (JP) ............................................ 11-258853

(51) Int. Cl.[7] .......................... F16K 31/02; F16K 51/00
(52) U.S. Cl. ................... 251/129.15; 251/904; 251/360; 251/284
(58) Field of Search ........................... 251/129.15, 904, 251/360, 359, 284, 333, 77

(56) References Cited

U.S. PATENT DOCUMENTS

| | | | | |
|---|---|---|---|---|
| 4,540,154 A | * | 9/1985 | Kolchinsky et al. | ... 251/129.15 |
| 4,566,486 A | * | 1/1986 | Taylor et al. | ............... 137/469 |
| 4,714,237 A | * | 12/1987 | Linderman et al. | ......... 251/330 |
| 4,783,049 A | * | 11/1988 | Northman et al. | ..... 251/129.14 |
| 5,064,169 A | * | 11/1991 | Alberts et al. | .............. 251/334 |
| 6,184,766 B1 | * | 2/2001 | Kojima et al. | .............. 335/255 |

FOREIGN PATENT DOCUMENTS

| | | |
|---|---|---|
| JP | 10-38126 | 2/1998 |
| JP | 2000-65233 | 3/2000 |

* cited by examiner

*Primary Examiner*—Philippe Derakshani
*Assistant Examiner*—David Austin Bonderer
(74) *Attorney, Agent, or Firm*—Nixon & Vanderhye PC

(57) ABSTRACT

In an electromagnetic valve, a seat member has a protruding portion having two parallel surfaces provided in the seat member. When the seat member is fixed to the base member by inserting molding, the two parallel surfaces of the protruding portion may be put between projecting portions of a pin of a molding die. As a result, the fluid passage of the seat member may be easily positioned to correspond to an opening of the base member. Further, after molding, the seat member may be prevented from rotating in the base member since the parallel surfaces are partly covered by resin of the base member.

11 Claims, 4 Drawing Sheets

ELECTROMAGNETIC VALVE

CROSS REFERENCE TO RELATED APPLICATION

This application is based upon and claims the benefit of priority of Japanese Patent Application No. H. 11-258853 filed on Sep. 13, 1999, the content of which is incorporated herein by reference.

BACKGROUND OF THE INVENTION

1. Field of the Invention

The present invention relates to an electromagnetic valve for opening and closing a fluid passage, in particular, a shape of a seat member of the electromagnetic valve.

2. Description of the Prior Art

In a conventional electromagnetic valve, a fluid passage formed in a seat member is opened and closed in such a manner that, when magnetic attracting force generated by a solenoid portion drives a moving core, a valve body is driven together with the moving core to sit on a valve seat provided in the fluid passage or to leave from the valve seat. The seat member, which is formed generally in a ring or cylindrical shape, is fixed to a base member made of resin by inserting molding.

In the conventional electromagnetic valve, it is very difficult to position the seat member to correspond to a position of an opening of the base member when the seat member is fixed to the base member by inserting molding. Further, as the base member surrounds a circumference of the ring or cylindrical seat member, the seat member is likely to rotate in the base member after molding so that opening and closing control of the fluid passage may be adversely affected.

Furthermore, as shown in JP-A-10-38126, known is a cup shaped stopper for restricting a movement of the moving core on an opposite side of the vale body. The conventional stopper is made of non-magnetic material and fitted inside to a solenoid constituting member such as a yoke. However, such a construction has a drawback that a magnetic attracting force of the solenoid portion may be reduced because non-magnetic material stands in a gap between the moving core and the yoke.

SUMMARY OF THE INVENTION

To solve the problems mentioned above, it is thus an object of the present invention to provide an electromagnetic valve in which a valve seat is easily fixed to a base member by inserting molding and opening and closing of the fluid passage may be accurately controlled.

To achieve the above object, the seat member has means for positioning and preventing rotation. The means for positioning and preventing rotation serves to position the seat member and partly be surrounded by the base member when the base member surrounds the seat member by inserting molding so that the fluid passage may be accurately positioned to correspond to the opening of the base member, while the seat member is prevented from rotating in the base member after the inserting molding.

Preferably, the means for positioning and preventing rotation comprises a protruding portion having two parallel surfaces provided in the seat member or notches provided in the seat member. When the seat member is fixed to the base member by inserting molding, the two parallel surfaces or the notches of the protruding portion may be put between projecting portions of a pin of a molding die. As a result, the fluid passage of the seat member may be easily positioned to correspond to the opening of the base member. Further, after molding, the seat member may be prevented from rotating in the base member since the parallel surfaces or notches are partly covered by resin of the base member.

Further, it is another object of the present invention to provide an electromagnetic valve in which magnetic attracting force is stronger and an invasion of foreign material into the solenoid portion may be prevented.

To achieve the object, the electromagnetic valve has a stopper for restricting a movement of the moving member in a direction opposite to the valve at an end of the solenoid portion on an opposite side of the valve. This construction serves to generate a higher magnetic attracting force since there is no non-magnetic material in a gap between the moving core and the yoke.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

First Embodiment

Figure 1:
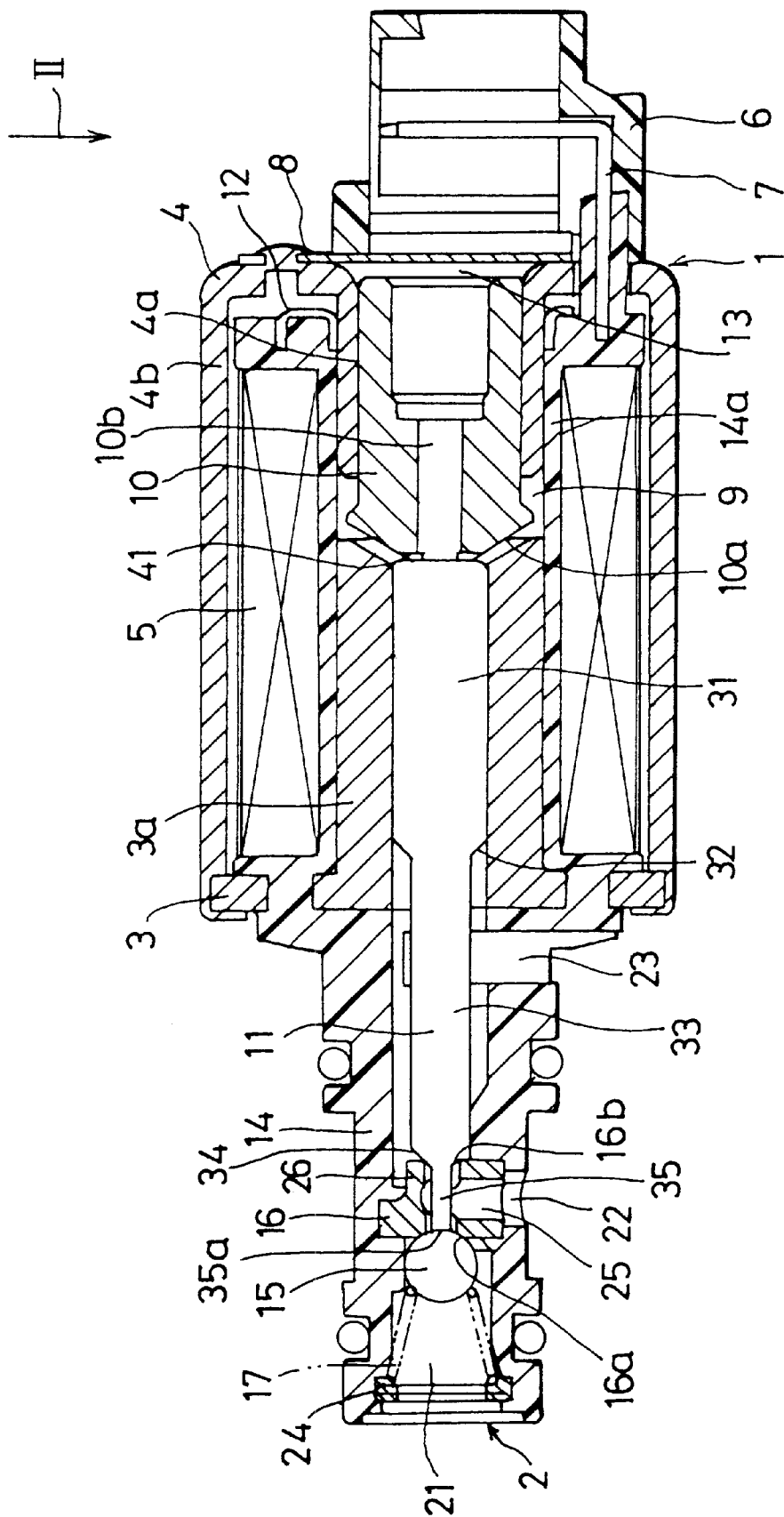
FIG. 1 is across sectional view of an electromagnetic valve according to a first embodiment.

An electromagnetic valve according to a first embodiment of the present invention, which is applied to a normally closed three-way valve, is described with reference to FIGS. 1 to 5B. FIG. 1 shows a state that current is not supplied to a solenoid portion 1 and a magnetic attracting force is not generated.

As shown in FIG. 1, the electromagnetic valve according to the first embodiment is composed of the solenoid portion 1, which generates a magnetic attracting force when energized, and a valve member 2, which is driven by the magnetic attracting force generated by the solenoid portion 1.

The solenoid portion 1 is composed of a cylindrical core 3 made of magnetic material, a yoke 4 fixed to the core 3 for constituting a magnetic circuit with the core 3, and a cylindrical coil 5 disposed between a center portion 4a of the yoke 4 and an outer diameter portion 4b of the yoke 4. One end of the coil 5 is connected to a terminal 7 fixed to a resin base member 14 by insert molding and the other end of the coil 5 is connected to a terminal 12 press fitted to the resin base member 14. The coil is wound around a coil bobbin formed integrally with the resin base member 14.

An inner diameter portion 3a of the core 3 faces axially the center portion 4a of the yoke 4 with a space gap therebetween. A moving core 10 made of magnetic material is arranged with a space surrounded by an inner wall of the center portion 4a of the yoke 4, an end surface of the inner diameter portion 3a of the core 3 and a plate 8 described later. The moving core 10 is provided at an end on a side of magnetic attraction, which is a left side in FIG. 1, with a taper portion 10a whose diameter is smaller toward the end on a side of magnetic attraction. The moving core 10 is provided at a center with a through hole 10b extending axially. Further, the moving core 10 is provided at the end on a side of magnetic attraction with a recess 41, which is communicated with a space gap 13 located on a right side in FIG. 1 and the space gap 9 provided axially between the inner diameter portion 3a of the core 3 and the center portion 4a of the yoke 4. Accordingly, the moving core may move freely in an axial direction.

Figure 2:
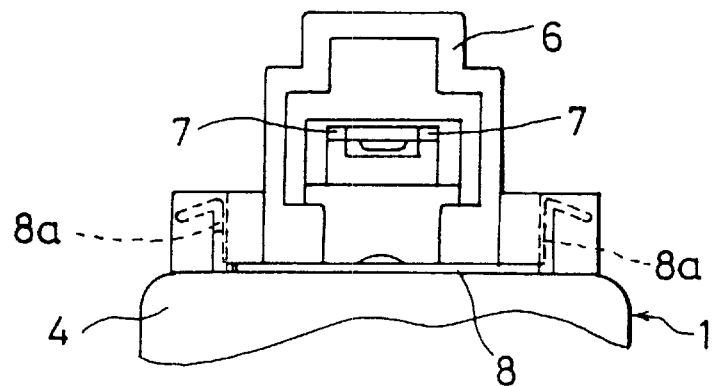
FIG. 2 is a perspective part view in a direction of an arrow E of FIG. 1.
Figure 3:
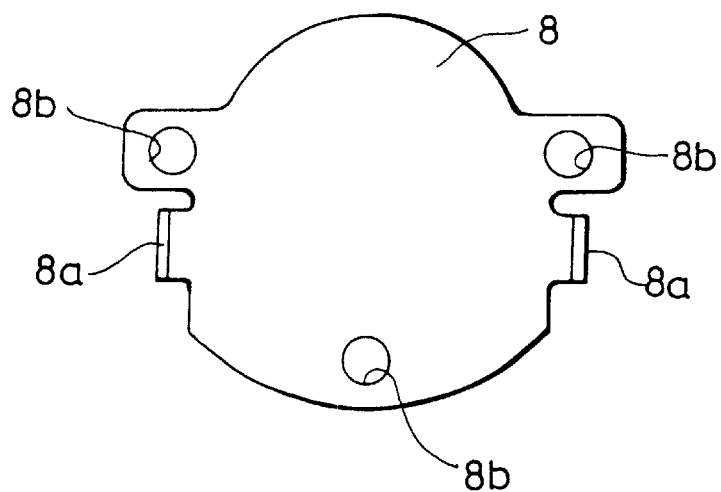
FIG. 3 is a plan view of a plate of the electromagnetic valve according to the first embodiment.
Figure 4:
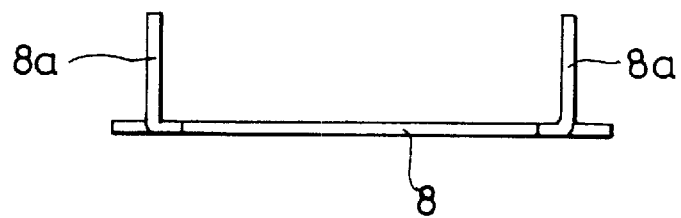
FIG. 4 is a front view of the plate of the electromagnetic valve according to the first embodiment.

The plate 8 is made of non-magnetic material and located at an end of the yoke 4 on a right side in FIG. 1 to serve as a stopper for restricting a movement of the moving core 10 in a direction opposite to the valve member. As shown in FIG. 3, the plate 8 is provided with holes 8b into which projections of the yoke 4 are inserted for fixing the plate 8 to the yoke 4 by caulking. As an alternative, the plate 8 may be fixed to the yoke 4 by welding without providing the holes 8b. The plate 8 is further provided, as shown in FIGS. 2 and 4, with two protruding portions 8a. A connector 6 is fixed to the plate 8 by bending the protruding portions 8a.

A shaft 11 made of non-magnetic material may move slidably and reciprocatingly in a same axis to the core 3 within the core 3 and the resin base portion 14. The shaft 11 is shaped as a column and composed of a slide portion 31, a first conical base portion 32, a larger diameter portion 33, a second conical base portion 34 and a smaller diameter portion 35. The slide portion 31 has a uniform outer diameter and fitted to an inner wall of the core with a clearance so as to move slidaby and reciprocatingly in an axial direction. The first conical base portion 32 is connected at an end on a larger diameter side to an end of the slide portion 31 and at the other end on a smaller diameter side to the larger diameter portion 33. The larger diameter portion 33 is connected at an end to the first conical base portion 32 and at the other end to the second conical base portion 34. The second conical base portion 34 may come in contact with a valve seat 16b of the seat member 16 described later. The one end of the smaller diameter portion 35 is connected to the second conical base portion 34 and the other end thereof may come in contact with a ball element 15 described later.

The base portion 14 is provided at an end on an opposite side to the solenoid with an input port 21 and at side surfaces with an output port 22 and a drain port 23. The base portion 14 covers the seat member 16 and the output port 22 as an opening is communicated to a communication hole 25 of the seat member 16.

The seat member 16, which is fixed to the base portion 14 by inserting molding, is basically shaped as a ring and has valve seats 16a and 16b for changing over the passages through which fluid is passed, the communication hole 25 as a fluid passage and a protrusion 16 having opposite surfaces parallel to each other. The ball element 15 may come in contact with the valve seat 16a. The second conical base portion 34 may come in contact with the valve seat 16b. As shown in FIG. 1, when the ball element sits on the valve seat 16a and the second conical base portion 34 is away from the valve seat 16b, the communication hole is communicated to the output port 22 and the drain port 23. When the ball element 15 is away from the valve seat 16a and the second conical base portion 34 sits on the valve seat 16b, the communication hole 25 is communicated to the input port 21 and the output port 22. The protrusion 16 serves to position the communication hole 25 to correspond to the output port 22, when the seat member 16 is fixed to the base portion 14 by inserting molding, and to prevent the seat member from rotating in the base portion 14 after molding.

Inside a free end of the base portion 14 on an opposite side of the solenoidmember, arranged are the ball element 15, a contracted coil spring 17 and a spring seat 24 also serving as a filter. The ball element 15 may come in contact with the valve seat 16a and the end surface 35a of the smaller diameter portion 35 of the shaft 11. As the coil spring 17 is at an end in contact with the ball element 15 and at the other end in contact with the spring seat 24, the ball element 15, the shaft 11 and the moving core 10 are urged toward the solenoid member 1, that is, in a direction against the magnetic attraction. The shaft 11 and the ball element constitute the valve member.

FIG. 1 shows a state of the valve when the coil 5 is not energized. The ball element 15, the shaft 11 and the moving core 10 are urged by the contracted coil spring 17 in a right direction in FIG. 1. As the ball element 15 sits on the valve seat 16a and the second conical base portion 34 is away from the valve seat 16b, the output port 22 is communicated to the drain port 23 and the communication of the input port 21 to the output port 22 or the drain port 23 is interrupted.

When the coil 5 is energized, a magnetic attracting force is generated between the inner diameter portion 3a of the core 3 and the moving core 10 so that the moving core 10, the shaft 11 and the ball element 15 may move against a biasing force of the coil spring 17 from the position shown in FIG. 1 to a magnetic attraction position on a left side in FIG. 1. As the ball element 15 leaves from the valve seat 16a and the second conical base portion 34 sits on the valve seat 16b, the input port 21 is communicated to the output port 22 and each communication of the input port 21 and the output port 22 to the drain port 23 is interrupted.

Next, assembly steps of the electromagnetic valve mentioned above is described.

Figure 5A:
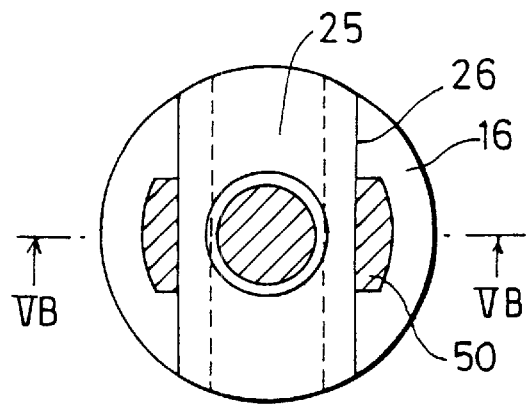
FIG. 5A is a plan view of a seat member of the electromagnetic valve according to the first embodiment.
Figure 5B:
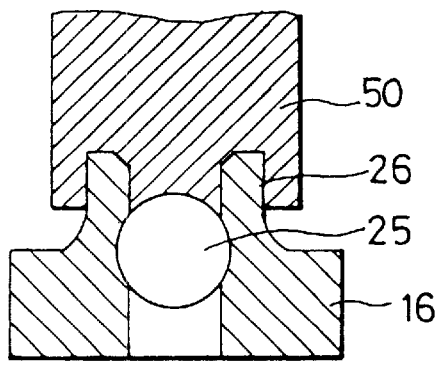
FIG. 5B is a cross sectional view taken along a line VB—VB of FIG. 5A.

(1) After the core 3, the seat member 16 and the terminal 7 are attached to a resin molding die, the resin base member 14 is formed by inserting molding. At this time, as shown in FIG. 5A, while a center projecting portion of a pin 50 of the resin molding die is inserted into a center hole of the valve seat 16a for positioning an axis of the seat member 16 on a same line to that of the axis of the core 3, the protrusion 26 of the seat member 16 is put between two side projecting portions of the pin 50 of the resin molding die so that the communication port 25 may be accurately positioned to correspond to a position of the output port 22 of the base portion 14. Further, as each cross sectional area of the projecting portions of the pin 50 is relatively large, each strength of the projecting portions is strong so that reliable inserting molding may be secured.

(2) The ball element 15, the contracted coil spring 17 and spring seat 24 are positioned within the input port 21 of the base portion 14 and, then, fixed within the input port 21 by processing through heat caulking a leading end of the base portion 14 on a left side in FIG. 1.

(3) After the coil 5 is wound around the coil bobbin integrally formed in the base portion 14, one end of the coil 15 is fixed to the terminal 7 embedded in the base portion 14 and the other end of the coil 15 is fixed to the terminal 12 press fitted into the base portion 14, both by fusing.

(4) The shaft 11 is inserted in an inside of the core 3.

(5) The plate 8 is fixed to a back end of the yoke 4 by caulking the projections fitted into the holes 8b of the plate 8 or by welding.

(6) After the moving core 10 is inserted into the center portion 4a of the yoke 4 and the center portion 4a is inserted in an inside of the coil bobbin 14a, the yoke 4 is fixed to the core 3 by caulking a front end of the yoke 4 toward the yoke 4.

(7) The terminal 7 is bent and formed in a predetermined shape.

(8) As shown in FIG. 2, the connector 6 is installed on the plate 8 and fixed to the plate 8 by bending the two protruding portions 8a inwardly or outwardly.

In the electromagnetic valve assembled according to the steps mentioned above, some parts of two parallel surfaces of the protrusion 26 of the seat member 16 are covered by the base portion 14 after inserting molding so that the seat member 16 may be prevented from rotating in the base portion 14 in an actual use of the valve. Further, the plate 8, which is provided at the back end of the yoke 4 on an opposite side to the valve member, serves to restrict a moving distance of the moving core 10 in a direction opposite to the valve member. Accordingly, without using a separate nonmagnetic member in a space between the inner wall of the center portion 4a of the yoke 4 and the moving core 10, as in the conventional electromagnetic valve, an invasion of foreign material into the inside of the solenoid member 1 may be prevented, while the solenoid member 1 may generate higher magnetic attracting force.

Next, an operation of the electromagnetic valve is described.

When current is not supplied to the solenoid member 1, the moving core 10, the shaft 11 and the ball element 15, which are urged by a biasing force of the contracted coil spring 17, are at positions shown in FIG. 1. When the coil 5 is energized, the moving core 10 is driven by magnetic attracting force to move the shaft 11 in a left direction in FIG. 1. As the shaft 11 is moved, the end surface 35a of the small diameter portion of the shaft 11 pushes the ball element 15 against the biasing force of the coil spring 17 in left direction in FIG. 1. As a result, the ball element 15 leaves the valve seat 16a and the second conical base portion 34 of the shaft 11 sits on the valve seat 16b so that the input port 21 may be communicated to the output port 22 and respective communications between the drain port 23 and the output port 22 and between the drain port 23 and the input port 21 may be interrupted.

Second Embodiment

Figure 7A:
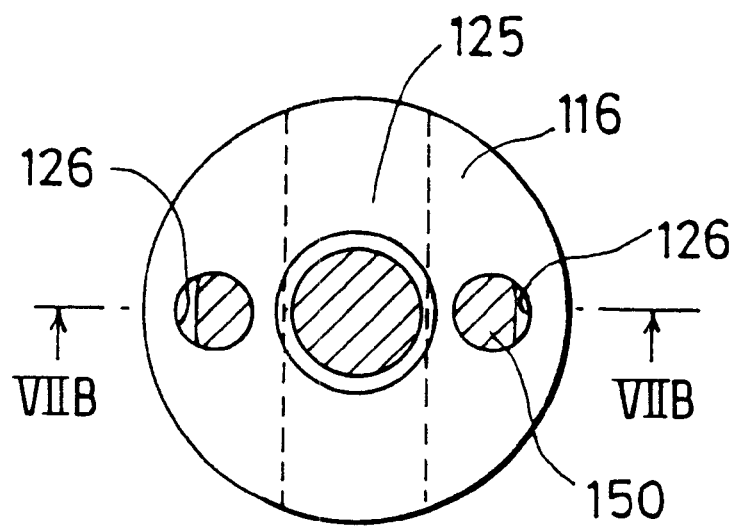
FIG. 7A is a plan view of a seat member of an electromagnetic valve according to a second embodiment.
Figure 7B:
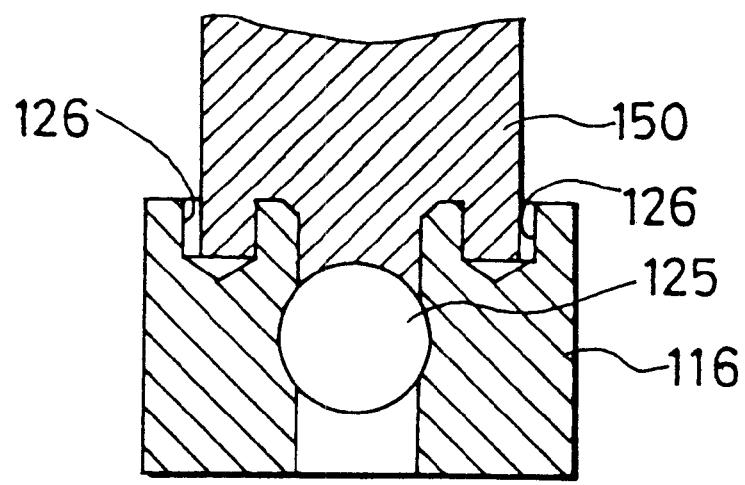
FIG. 7B is a cross sectional view taken along a line VIIB—VIIB FIG. 7A.

A second embodiment of the present invention is described with reference to FIGS. 7A and 7B. A ring shaped seat member 116 is provided with two holes 126. When the seat member 116 is fixed to the resin base portion by inserting molding, two projecting portions of a pin 150 of a resin molding die are inserted into the two holes 126 of the seat member 116 for positioning a communication hole 125 of the seat member 116 so as to correspond to a position of the output port of the base portion. If each diameter of the holes 126 is too small, each diameter of the projecting portions of the pin 150 becomes so small that each projecting portion may break down during the inserting molding process. Therefore, the diameter of the hole 126 has to be sufficiently large to an extent that the projecting portions of the pin 150 do not break down during the inserting molding process.

Further, if the base portion grasps in a flat shape the ring shaped seat member 116 during the inserting molding process, the seat member 116 is likely to rotate in the base portion during the actual use.

Third Embodiment

Figure 6:
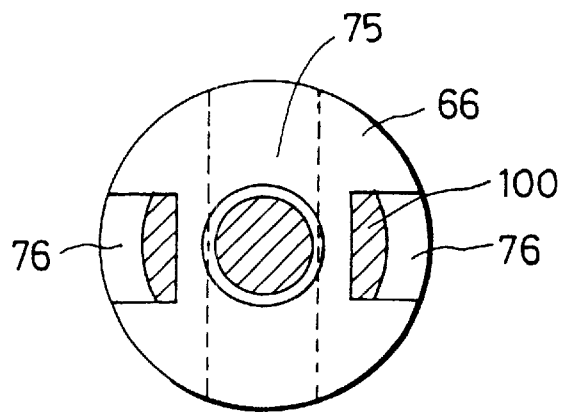
FIG. 6 is a plan view of a seat member of an electromagnetic valve according to a third embodiment.

A third embodiment of the present invention is described with reference to FIG. 6. According to the third embodiment, a seat member 66 is provided with notches 76 instead of the two parallel surfaces of the protrusion 26 shown in FIG. 5 according to the first embodiment.

The seat member 66 is basically formed in a ring shape and has two notches 76 at an outer circumference thereof. When the seat member 66 is assembled with the resin base portion by inserting molding, a communication hole 75 of the seat member 66 may be accurately positioned to correspond to the output port of the base member by inserting two projecting portions of a pin 100 into the two notches 76. Remaining portions of the notches 76 where the projecting portions of the pin 100 are not positioned are filled with resin of the base member so that the seat member 66 may be prevented from rotating in the base member during the actual use. It is important that each diameter of the projecting portions of the pin 100 is relatively large to an extent that the projecting portions of the pin are not broken down during the inserting molding process.

In the electromagnetic valve according to the embodiments mentioned above, the seat member may be easily positioned with respect to the base member and be rigidly fixed to the base member not to rotate therein. With a simple construction mentioned above, the electromagnetic valve in which the fluid passage may be accurately opened and closed can be realized.

What is claimed is:

1. An electromagnetic valve comprising:

a seat member having a fluid passage including a radial fluid passage part through which fluid flows, a valve seat, and means for positioning and preventing rotation;

a valve capable of closing the fluid passage when the valve comes in contact with the valve seat;

a resin base member surrounding the seat member by insert molding and having an opening provided at a given circumferential position to communicate with the radial fluid passage part;

a driving member fixed to an axial end of the base member for generating a magnetic attracting force, when energized; and a moving member for moving the valve in a predetermined direction upon receiving the magnetic attracting force, wherein the means for positioning and preventing rotation serves to position the seat member so that the fluid passage extends radially to an angular position corresponding to the opening of the base member, and wherein the means for positioning and preventing rotation is partly surrounded by the base member so that the seat member is prevented from rotating in the base member after the inserting molding.

2. An electromagnetic valve according to claim 1 wherein the means for positioning and preventing rotation comprises a protruding portion having two parallel surfaces provided in the seat member.

3. An electromagnetic valve according to claim 1 wherein the means for positioning and preventing rotation comprises notches provided in the seat member.

4. An electromagnetic valve according to claim 1, wherein the driving member is provided at an end on an opposite side of the valve with a restricting member for restricting a movement of the moving member in a direction opposite to the valve.

5. An electromagnetic valve according to claim 1, wherein the driving member has a yoke, a coil and a restricting member for restricting a movement of the moving member in a direction opposite to the valve, the restricting member being fixed by staking a part of the yoke to an end of the yoke on an opposite side of the valve.

6. An electromagnetic valve comprising:

a seat member having a fluid passage including a radial port through which fluid flows, a surface defining a valve seat, and at least one of a protrusion and a notch;

a valve mounted to selectively contact the valve seat to close the fluid passage;

a resin base member surrounding the seat member by insert molding and having an opening provided at a given circumferential position to communicate with the radial port;

a driving member fixed to an axial end of the base member for generating a magnetic attracting force, when energized; and a moving member for moving the valve in a predetermined direction upon receiving the magnetic attracting force, wherein the protrusion or notch is configured to be engaged by a positioning pin of a molding dye for aligning the radial port with the opening of the base member during insert molding of the resin base member and so as to be partly surrounded by the resin base member during insert molding, so that after insert molding the seat member is prevented from rotating in the base member.

7. An electromagnetic valve according to claim 6, wherein said protrusion comprises at least one surface defined in a plane generally parallel to a center axis of the seat member.

8. An electromagnetic valve according to claim 6, wherein said protrusion comprises first and second parallel surfaces each defined in a plane generally parallel to a center axis of the seat member.

9. An electromagnetic valve according to claim 6, wherein said notch comprises on axial bore, defined in the seat member so as to be generally parallel to and laterally offset from a center axis of the seat member.

10. An electromagnetic valve according to claim 9, wherein there are two notches on diametrically opposite sides of the center axis of the seat member.

11. An electromagnetic valve according to claim 6, wherein said protrusion protrudes axially, generally co-axial to a center axis of the seat member.

* * * * *